March 10, 1925.

D. H. GREENWOOD

SAFETY VALVE FOR FLUID DRIVEN MOTORS

Filed Aug. 18, 1924

1,529,178

Inventor

DOLPHICE H. GREENWOOD.

By Lyon & Lyon
Attorneys

Patented Mar. 10, 1925.

1,529,178

UNITED STATES PATENT OFFICE.

DOLPHICE H. GREENWOOD, OF PASADENA, CALIFORNIA.

SAFETY VALVE FOR FLUID DRIVEN MOTORS.

Application filed August 18, 1924. Serial No. 732,740.

*To all whom it may concern:*

Be it known that I, DOLPHICE H. GREENWOOD, a citizen of the United States, residing at Pasadena, in the county of Los Angeles and State of California, have invented a new and useful Safety Valve for Fluid Driven Motors, of which the following is a specification.

This invention relates to motors driven by fluid under pressure and it has great utility when applied to a steam engine because it can operate as a safety device to prevent injury to a man working about the engine.

In the operation of steam engines used in connection with oil well machinery, after the throttle valve is closed it sometimes happens that steam leaks past the valve and accumulates in the receiver of the engine; then this may build up the pressure sufficiently to move the engine through a stroke or two. As this movement of the engine occurs without any warning a workman near the engine is in danger of injury by exposed rotary parts such as the crank or fly-wheel. The arms of workmen have sometimes been broken due to this cause and occasionally a man has been killed in this way.

The general object of this invention is to provide such a motor or engine with means for preventing such an accidental movement of the engine and more particularly to provide means for effecting the release of the pressure in the receiver when the throttle valve is closed.

Further objects of the invention will appear hereinafter.

The invention consists in the novel parts and combinations of parts to be described hereinafter, all of which contribute to produce an efficient safety valve for fluid driven motors.

A preferred embodiment of the invention is described in the following specification, while the broad scope of the invention is pointed out in the appended claims.

Figure 1:
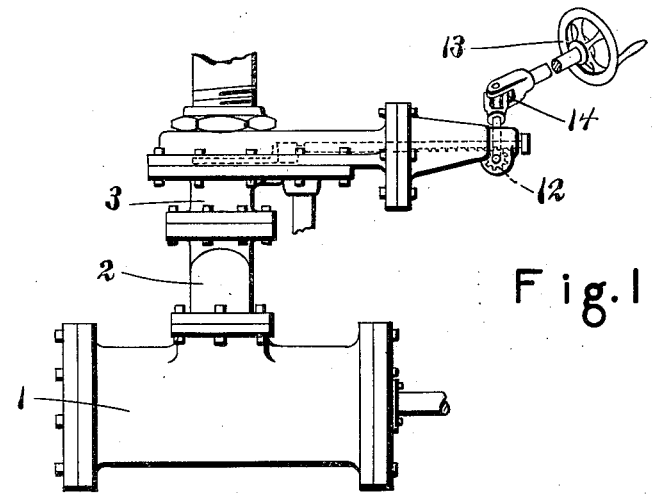
Figure 1 is a side elevation showing parts of an engine to which my invention has been applied.
Figure 2:
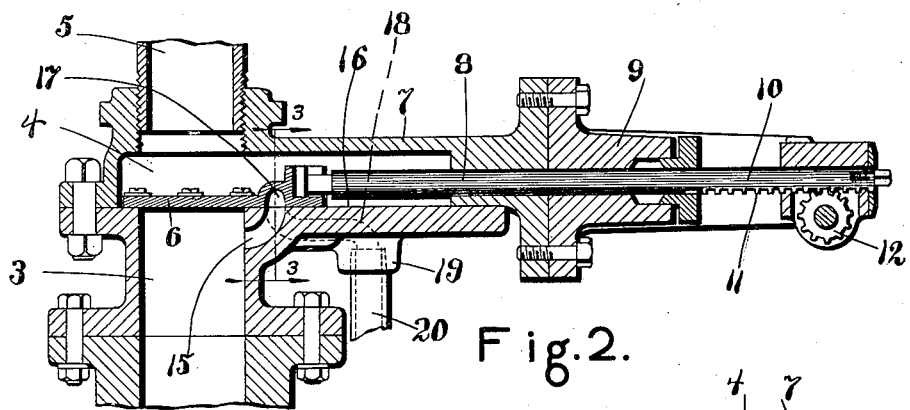
Fig. 2 is a longitudinal vertical section through the valve-chest, passing through the receiver, and illustrating details of the preferred embodiment of the invention.

In the following specification, by way of example, I have described the invention as applied to a steam engine of the type commonly used in connection with the operation of machinery near an oil well. As is usual, this engine includes exposed rotary parts such as a crank and fly-wheel, not illustrated. This type of engine also usually includes two cylinders such as the cylinder 1, connected by a manifold 2, mounted upon a receiver 3 which is supplied with steam from a steam-chest 4. This steam-chest is provided with a valve for cutting off flow of steam from the steam pipe 5. I do not limit myself to any particular type of valve. In the present instance I have illustrated a gate valve 6 in the form of a slide which is guided to slide longitudinally in a valve casing 7.

Figure 3:
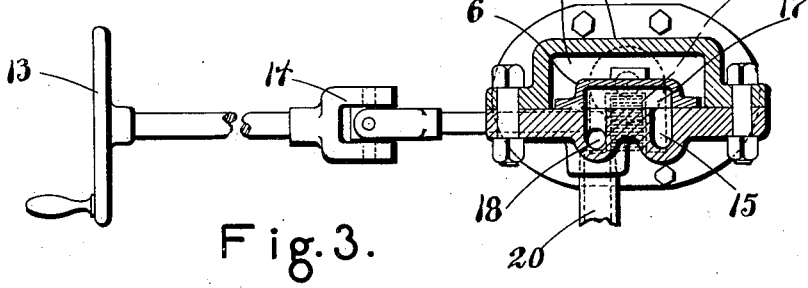
Fig. 3 is a cross-section through the steam-chest and further illustrating details of the invention, certain parts being broken away.

I provide means for releasing the pressure in the receiver when the valve is closed. In order to accomplish this, one end of the valve is attached to a stem 8, the outer end of which passes through a guide 9 beyond which the stem is formed into a rack 10 with teeth 11 on its underside. These teeth mesh with a pinion 12 which may be operated from a distance by hand-wheel 13 connected to the shaft of the pinion 12, through a universal joint 14. According to my invention the releasing of the pressure is preferably effected automatically; for this purpose I construct the valve mechanism in such a way that when the valve is moved to its closed position the steam pressure in the receiver 3 is released. I prefer to effect the releasing of this steam pressure in the receiver by opening communication between the receiver and the atmosphere. In order to accomplish this I provide a passage 15 in the wall of the receiver which communicates with the interior of the receiver and which opens upon the valve seat 16. In the valve 4 I provide a port 17 which is preferably disposed transversely of the valve and when the valve is closed this port registers with the passage 15 so as to open communication with the passage 15 and another passage 18 which also opens out onto the valve seat, and extends over to a boss 19 where it connects with an exhaust pipe 20 which may lead to the atmosphere or to a drain. Figure 3 shows the manner in which the port 17 connects the receiver 3 to the atmosphere or to the exhaust pipe 20 when the valve is in its closed position.

When an engine is provided with this improvement, it will be evident that in case steam leaks from the steam-chest into the receiver 3, it cannot accumulate in the receiver so as to produce any pressure but it will immediately find exit through the passages 15 and 18 and the communicating port 17. Hence when this valve 6 has been closed the engine will stop and it will not be possible for it to start accidentally. In this way accidents such as those suggested above will be avoided.

It is understood that the embodiment of the invention described herein is only one of the many embodiments this invention may take, and I do not wish to be limited in the practice of the invention, nor in the claims, to the particular embodiment set forth.

I claim:

1. In a fluid operated engine having exposed rotating parts, and a receiver for the operating fluid, the combination of a valve for shutting off flow of the operating fluid to the receiver, and means for releasing the pressure in the receiver when the valve is moved to its closed position.

2. In a fluid operated engine having exposed rotating parts, and a receiver for the operating fluid, the combination of a valve for shutting off flow of the operating fluid to the receiver, and automatic means for opening communication from the receiver to the atmosphere when the valve is moved to its closed position.

3. In a fluid operated engine having a receiver for the operating fluid, the combination of a valve for shutting off flow of the operating fluid to the receiver, said valve having a port for releasing the pressure in the receiver when the valve is moved to its closed position.

4. In a fluid operated engine having a receiver for the operating fluid, the combination of a valve for shutting off flow of the operating fluid to the receiver, said receiver having a passage leading to the atmosphere and said valve having a port to communicate with the passage when the valve is in its closed position, to release the pressure in the receiver.

5. In a steam engine having a steam-chest with a valve seat, the combination of a valve mounted to move on said seat for shutting off flow of steam to the receiver, said seat having a passage leading to the atmosphere, and said valve having a port on its inner face communicating with said passage to release the steam in the receiver when the valve is in its closed position.

Signed at Los Angeles, California, this 24th day of July 1924.

DOLPHICE H. GREENWOOD.